US012627863B2

(12) United States Patent
Funk et al.

(10) Patent No.: US 12,627,863 B2
(45) Date of Patent: *May 12, 2026

(54) SEARCHING AND DISPLAYING MULTIMEDIA SEARCH RESULTS

(71) Applicant: Roku, Inc., San Jose, CA (US)

(72) Inventors: Jim Funk, Los Altos, CA (US); Brandon Noffsinger, Colorado Springs, CO (US)

(73) Assignee: ROKU, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/788,277

(22) Filed: Jul. 30, 2024

(65) Prior Publication Data

US 2024/0388768 A1     Nov. 21, 2024

Related U.S. Application Data

(63) Continuation of application No. 18/139,576, filed on Apr. 26, 2023, which is a continuation of application
(Continued)

(51) Int. Cl.
*H04N 21/482* (2011.01)
*G06F 16/2455* (2019.01)
(Continued)

(52) U.S. Cl.
CPC ... *H04N 21/4828* (2013.01); *G06F 16/24565* (2019.01); *G06F 16/43* (2019.01);
(Continued)

(58) Field of Classification Search
CPC ............ H04N 21/4828; H04N 21/237; H04N 21/2387; H04N 21/4126; H04N 21/4668;
(Continued)

(56) References Cited

U.S. PATENT DOCUMENTS 4,363,489 A     12/1982  Chodak et al.
5,801,747 A      9/1998  Bedard
(Continued)

OTHER PUBLICATIONS

Anonymous, "Ninja and Pringo Partner to Boost Adoption of Mobile Social Networking", Marketwire, May 13, 2008, 2 pgs.
(Continued)

*Primary Examiner* — Timothy R Newlin
(74) *Attorney, Agent, or Firm* — Sterne, Kessler, Goldstein & Fox P.L.L.C.

(57)     ABSTRACT

A system and method for searching and displaying multimedia search results is disclosed herein. An embodiment operates by supplying a video stream to a primary display. An information request soliciting information associated with content of the video stream on the primary display is received. In response, a plurality of tag data relating to the video stream is supplied to a secondary display, wherein the plurality of tag data are visually and concurrently indicated on a single progress bar of the video stream being displayed on the secondary display, and whereby the tag content data is displayed on the display screen of the secondary display when one of the plurality of tag types is selected.

20 Claims, 11 Drawing Sheets

Related U.S. Application Data

No. 17/327,486, filed on May 21, 2021, now Pat. No. 11,681,741, which is a continuation of application No. 14/558,648, filed on Dec. 2, 2014, now Pat. No. 11,061,957, which is a continuation of application No. 14/536,339, filed on Nov. 7, 2014, now Pat. No. 9,519,645, which is a continuation-in-part of application No. 13/778,068, filed on Feb. 26, 2013, now Pat. No. 9,137,578, which is a continuation-in-part of application No. 13/431,932, filed on Mar. 27, 2012, now abandoned.

(51) Int. Cl.

| | |
|---|---|
| *G06F 16/43* | (2019.01) |
| *G06F 16/438* | (2019.01) |
| *G06F 16/48* | (2019.01) |
| *G06F 16/951* | (2019.01) |
| *G06F 16/9535* | (2019.01) |
| *H04N 21/237* | (2011.01) |
| *H04N 21/2387* | (2011.01) |
| *H04N 21/41* | (2011.01) |
| *H04N 21/466* | (2011.01) |
| *H04N 21/472* | (2011.01) |
| *H04N 21/8405* | (2011.01) |

(52) U.S. Cl.

CPC ............ *G06F 16/438* (2019.01); *G06F 16/48* (2019.01); *G06F 16/951* (2019.01); *G06F 16/9535* (2019.01); *H04N 21/237* (2013.01); *H04N 21/2387* (2013.01); *H04N 21/4126* (2013.01); *H04N 21/4668* (2013.01); *H04N 21/47208* (2013.01); *H04N 21/47217* (2013.01); *H04N 21/8405* (2013.01)

(58) Field of Classification Search

CPC ....... H04N 21/47208; H04N 21/47217; H04N 21/8405; G06F 16/24565; G06F 16/43; G06F 16/438; G06F 16/48; G06F 16/951; G06F 16/9535

See application file for complete search history.

(56) References Cited

U.S. PATENT DOCUMENTS

| | | | |
|---|---|---|---|
| 5,933,811 A | 8/1999 | Angles et al. | |
| 6,331,877 B1 | 12/2001 | Bennington et al. | |
| 6,519,693 B1 * | 2/2003 | Debey .................. | H04N 21/426 |
| | | | 348/E7.071 |
| 6,567,984 B1 | 5/2003 | Allport | |
| 6,754,662 B1 | 6/2004 | Li | |
| 7,305,406 B2 | 12/2007 | Liu et al. | |
| 7,319,806 B1 * | 1/2008 | Willner ................... | H04N 5/76 |
| | | | 725/151 |
| 7,627,888 B2 | 12/2009 | Ganesan et al. | |
| 7,742,740 B2 | 6/2010 | Goldberg et al. | |
| 7,778,980 B2 | 8/2010 | Bodin et al. | |
| 7,802,286 B2 | 9/2010 | Brooks et al. | |
| 7,840,986 B2 | 11/2010 | Ali et al. | |
| 7,849,135 B2 | 12/2010 | Agrawal et al. | |
| 7,895,624 B1 | 2/2011 | Thomas et al. | |
| 7,929,029 B2 | 4/2011 | Morimoto et al. | |
| 7,953,730 B1 | 5/2011 | Bleckner et al. | |
| 8,005,913 B1 | 8/2011 | Carlander | |
| 8,094,891 B2 | 1/2012 | Andreasson | |
| 8,159,959 B2 | 4/2012 | Ohlfs et al. | |
| 8,171,112 B2 | 5/2012 | Shum et al. | |
| 8,265,612 B2 | 9/2012 | Athsani et al. | |
| 8,584,165 B1 | 11/2013 | Kane et al. | |
| 8,615,776 B2 | 12/2013 | Hill et al. | |
| 8,640,166 B1 | 1/2014 | Craner | |
| 9,116,990 B2 | 8/2015 | Sun et al. | |

| | | | |
|---|---|---|---|
| 9,137,578 B2 | 9/2015 | Garner | |
| 9,519,645 B2 | 12/2016 | Funk et al. | |
| 10,261,999 B2 | 4/2019 | Funk et al. | |
| 11,061,957 B2 | 7/2021 | Funk et al. | |
| 11,681,741 B2 | 6/2023 | Funk et al. | |
| 2001/0037240 A1 | 11/2001 | Marks et al. | |
| 2001/0054059 A1 | 12/2001 | Marks et al. | |
| 2002/0007368 A1 | 1/2002 | Lee et al. | |
| 2002/0042923 A1 | 4/2002 | Asmussen et al. | |
| 2002/0078449 A1 | 6/2002 | Gordon et al. | |
| 2002/0100063 A1 * | 7/2002 | Herigstad .......... | H04N 21/4782 |
| | | | 348/E7.071 |
| 2002/0107973 A1 | 8/2002 | Lennon et al. | |
| 2002/0135608 A1 | 9/2002 | Hamada et al. | |
| 2002/0174430 A1 | 11/2002 | Ellis et al. | |
| 2002/0184650 A1 | 12/2002 | Stone | |
| 2003/0018748 A1 | 1/2003 | McKenna, Jr. | |
| 2003/0088687 A1 | 5/2003 | Begeja et al. | |
| 2003/0093790 A1 | 5/2003 | Logan et al. | |
| 2003/0110503 A1 | 6/2003 | Perkes | |
| 2003/0131355 A1 | 7/2003 | Berenson et al. | |
| 2003/0132953 A1 | 7/2003 | Johnson et al. | |
| 2003/0184598 A1 * | 10/2003 | Graham ............... | G11B 27/034 |
| | | | 707/E17.058 |
| 2003/0193518 A1 | 10/2003 | Newnam et al. | |
| 2003/0208763 A1 | 11/2003 | McElhatten et al. | |
| 2003/0221194 A1 * | 11/2003 | Thiagarajan ....... | H04N 7/17318 |
| | | | 348/E7.071 |
| 2004/0049779 A1 * | 3/2004 | Sjoblom ............ | H04N 7/17318 |
| | | | 348/E5.103 |
| 2004/0070593 A1 | 4/2004 | Neely et al. | |
| 2004/0078383 A1 | 4/2004 | Mercer et al. | |
| 2004/0078816 A1 | 4/2004 | Johnson | |
| 2004/0098744 A1 | 5/2004 | Gutta | |
| 2004/0098747 A1 | 5/2004 | Kay et al. | |
| 2004/0117831 A1 | 6/2004 | Ellis et al. | |
| 2004/0170386 A1 | 9/2004 | Mikawa | |
| 2004/0194131 A1 | 9/2004 | Ellis et al. | |
| 2005/0132401 A1 * | 6/2005 | Boccon-Gibod .. | H04N 21/8455 |
| | | | 725/35 |
| 2005/0160461 A1 | 7/2005 | Baumgartner et al. | |
| 2005/0177624 A1 | 8/2005 | Oswald et al. | |
| 2005/0204387 A1 | 9/2005 | Knudson et al. | |
| 2005/0273499 A1 | 12/2005 | Goodman et al. | |
| 2006/0064716 A1 | 3/2006 | Sull et al. | |
| 2006/0159109 A1 | 7/2006 | Lamkin et al. | |
| 2006/0173985 A1 | 8/2006 | Moore | |
| 2006/0235885 A1 | 10/2006 | Steele et al. | |
| 2006/0236243 A1 | 10/2006 | Brain | |
| 2006/0248013 A1 | 11/2006 | Ebert et al. | |
| 2006/0265427 A1 | 11/2006 | Cohen et al. | |
| 2006/0282855 A1 * | 12/2006 | Margulis ............... | G06F 3/1446 |
| | | | 348/E5.002 |
| 2006/0282864 A1 * | 12/2006 | Gupte ................ | H04N 21/4405 |
| | | | 725/89 |
| 2007/0014534 A1 * | 1/2007 | Kim ....................... | G11B 27/34 |
| | | | 386/241 |
| 2007/0033166 A1 | 2/2007 | Trowbridge et al. | |
| 2007/0037240 A1 | 2/2007 | Martin et al. | |
| 2007/0038931 A1 | 2/2007 | Allaire et al. | |
| 2007/0078884 A1 | 4/2007 | Ott, IV et al. | |
| 2007/0089143 A1 * | 4/2007 | LeFevre ........... | H04N 21/43615 |
| | | | 348/E5.007 |
| 2007/0097975 A1 | 5/2007 | Rakers et al. | |
| 2007/0112817 A1 | 5/2007 | Danninger | |
| 2007/0124779 A1 | 5/2007 | Casey et al. | |
| 2007/0129109 A1 | 6/2007 | Silverbrook et al. | |
| 2007/0130126 A1 | 6/2007 | Lucovsky et al. | |
| 2007/0130610 A1 | 6/2007 | Aarnio et al. | |
| 2007/0156589 A1 | 7/2007 | Zimler et al. | |
| 2007/0162424 A1 | 7/2007 | Jeh et al. | |
| 2007/0188665 A1 | 8/2007 | Watson et al. | |
| 2007/0204311 A1 | 8/2007 | Hasek et al. | |
| 2007/0220554 A1 | 9/2007 | Barton et al. | |
| 2007/0220583 A1 | 9/2007 | Bailey et al. | |
| 2007/0244902 A1 | 10/2007 | Seide et al. | |
| 2007/0266401 A1 | 11/2007 | Hallberg | |
| 2007/0300252 A1 | 12/2007 | Acharya et al. | |

(56) References Cited

U.S. PATENT DOCUMENTS

| | | | |
|---|---|---|---|
| 2008/0033922 A1 | 2/2008 | Cisler et al. | |
| 2008/0046928 A1 | 2/2008 | Poling et al. | |
| 2008/0083003 A1 | 4/2008 | Biniak et al. | |
| 2008/0089551 A1* | 4/2008 | Heather | H04N 21/47815 |
| | | | 375/E7.018 |
| 2008/0098450 A1 | 4/2008 | Wu et al. | |
| 2008/0123954 A1* | 5/2008 | Ekstrand | G06F 16/739 |
| | | | 382/173 |
| 2008/0133311 A1 | 6/2008 | Madriz Ottolina | |
| 2008/0151888 A1 | 6/2008 | Ahmed | |
| 2008/0155057 A1 | 6/2008 | Khedouri et al. | |
| 2008/0163318 A1 | 7/2008 | Chen et al. | |
| 2008/0235608 A1 | 9/2008 | Prabhu | |
| 2009/0037954 A1 | 2/2009 | Nagano | |
| 2009/0082095 A1 | 3/2009 | Walker et al. | |
| 2009/0094520 A1 | 4/2009 | Kulas | |
| 2009/0100147 A1 | 4/2009 | Igarashi | |
| 2009/0116817 A1* | 5/2009 | Kim | H04N 21/4312 |
| | | | 386/239 |
| 2009/0119254 A1 | 5/2009 | Cross et al. | |
| 2009/0129741 A1* | 5/2009 | Kim | G11B 27/34 |
| | | | 386/E5.001 |
| 2009/0133090 A1 | 5/2009 | Busse | |
| 2009/0142036 A1 | 6/2009 | Branam et al. | |
| 2009/0154899 A1 | 6/2009 | Barrett et al. | |
| 2009/0156181 A1 | 6/2009 | Athsani et al. | |
| 2009/0157480 A1 | 6/2009 | Smith | |
| 2009/0165043 A1 | 6/2009 | Ou et al. | |
| 2009/0165054 A1 | 6/2009 | Rudolph | |
| 2009/0183221 A1 | 7/2009 | Klein et al. | |
| 2009/0216745 A1* | 8/2009 | Allard | G06F 16/40 |
| | | | 707/999.005 |
| 2009/0228937 A1 | 9/2009 | Williams | |
| 2009/0239514 A1 | 9/2009 | Kenagy et al. | |
| 2009/0282021 A1 | 11/2009 | Bennett | |
| 2009/0327892 A1 | 12/2009 | Douillet et al. | |
| 2010/0037260 A1* | 2/2010 | Fukuda | H04N 21/4751 |
| | | | 725/39 |
| 2010/0057924 A1 | 3/2010 | Rauber et al. | |
| 2010/0070057 A1 | 3/2010 | Sugiyama | |
| 2010/0092152 A1* | 4/2010 | Son | H04N 21/4348 |
| | | | 348/E7.003 |
| 2010/0113148 A1 | 5/2010 | Haltovsky et al. | |
| 2010/0131495 A1 | 5/2010 | Murdock et al. | |
| 2010/0153885 A1 | 6/2010 | Yates | |
| 2010/0248839 A1 | 9/2010 | Davis et al. | |
| 2010/0251304 A1 | 9/2010 | Donoghue et al. | |
| 2010/0304727 A1 | 12/2010 | Agrawal et al. | |
| 2011/0023068 A1 | 1/2011 | Zeldis et al. | |
| 2011/0126249 A1 | 5/2011 | Makhlouf | |
| 2011/0179453 A1 | 7/2011 | Poniatowski | |
| 2011/0184940 A1 | 7/2011 | Fazil | |
| 2011/0184963 A1 | 7/2011 | Singh Thakur et al. | |
| 2011/0191314 A1 | 8/2011 | Howes et al. | |
| 2011/0214147 A1 | 9/2011 | Kashyap et al. | |
| 2011/0225417 A1 | 9/2011 | Maharajh et al. | |
| 2011/0252100 A1 | 10/2011 | Raciborski et al. | |
| 2011/0276396 A1 | 11/2011 | Rathod | |
| 2011/0289530 A1 | 11/2011 | Dureau et al. | |
| 2011/0307927 A1 | 12/2011 | Nakano et al. | |
| 2011/0314084 A1 | 12/2011 | Saretto et al. | |
| 2011/0321072 A1 | 12/2011 | Patterson et al. | |
| 2011/0321093 A1 | 12/2011 | McRae | |
| 2012/0072432 A1 | 3/2012 | Crosa et al. | |
| 2012/0078953 A1 | 3/2012 | Araya | |
| 2012/0079529 A1 | 3/2012 | Harris et al. | |
| 2012/0096499 A1 | 4/2012 | Dasher et al. | |
| 2012/0110623 A1 | 5/2012 | Hill et al. | |
| 2012/0131627 A1 | 5/2012 | Chittella | |
| 2012/0159549 A1 | 6/2012 | Douillet et al. | |
| 2012/0173383 A1 | 7/2012 | Badawiyeh et al. | |
| 2012/0192217 A1 | 7/2012 | Jeong et al. | |
| 2012/0197987 A1 | 8/2012 | Mori et al. | |
| 2012/0204201 A1 | 8/2012 | Cassidy et al. | |
| 2012/0210358 A1 | 8/2012 | Anthru et al. | |
| 2012/0221645 A1 | 8/2012 | Anthru et al. | |
| 2012/0226536 A1 | 9/2012 | Kidron | |
| 2012/0297423 A1 | 11/2012 | Kanojia et al. | |
| 2012/0304223 A1 | 11/2012 | Sargent et al. | |
| 2012/0311623 A1 | 12/2012 | Davis et al. | |
| 2013/0060660 A1 | 3/2013 | Maskatia et al. | |
| 2013/0074109 A1 | 3/2013 | Skelton et al. | |
| 2013/0081084 A1 | 3/2013 | Scheer | |
| 2013/0133007 A1 | 5/2013 | White et al. | |
| 2013/0174035 A1 | 7/2013 | Grab | |
| 2013/0239024 A1 | 9/2013 | Lewis et al. | |
| 2013/0263189 A1 | 10/2013 | Funk et al. | |
| 2013/0268975 A1 | 10/2013 | Korst et al. | |
| 2013/0304547 A1* | 11/2013 | Adler | G06Q 10/06393 |
| | | | 705/7.39 |
| 2014/0033038 A1* | 1/2014 | Callanan | H04N 21/8455 |
| | | | 715/719 |
| 2014/0201802 A1 | 7/2014 | Boss et al. | |
| 2014/0223481 A1 | 8/2014 | Fundament | |
| 2015/0066913 A1 | 3/2015 | Funk et al. | |
| 2015/0073871 A1 | 3/2015 | Hu et al. | |
| 2015/0088869 A1 | 3/2015 | Funk et al. | |
| 2015/0339312 A1 | 11/2015 | Lin et al. | |
| 2016/0127763 A1 | 5/2016 | Patel et al. | |
| 2021/0279270 A1 | 9/2021 | Funk et al. | |
| 2023/0267143 A1 | 8/2023 | Funk et al. | |

OTHER PUBLICATIONS

Anonymous, "TWAIN—Linking Applications and Images", Computer Technology Review, vol. 13, No. 6, May 1993, 5 pgs.

Anonymous, "Update: Memeo® Enhances Photo Sharing Offering with PC, Mac and iPhoneTM Products", Marketwire, Sep. 16, 2008, 2 pgs.

Dumais et al., "Stuff I've Seen: A System for Personal Information Retrieval and Re-Use", ACM SIGIR'03, Jul. 28-Aug. 1, 2003, pp. 72-79.

Cesar, "Social Television and User Interaction", ACM Computers in Entertainment, 6(1), 10 pages (May 2008).

The Play Team, MiTV: Rethinking Interactive TV, Proceedings of the Seventh International Conference on Virtual Systems and Multimedia (VSMM), IEEE, 5 pages, (2001).

* cited by examiner

200

230

210 star

Star (I) (2001)

Star (1993) Movie

The Star (1952)

The Fault in Our Stars (2014)

Star Wars Rebels (2014) (TV Series)

Star Wars: Episode IV (1977)

Star Trek (2009)

Star Trek (1966) (TV Series)

Starred Up (2013

220

400

402 — Receive search term from user

404 — Perform search for content using search term

406 — Associate and save search term with user profile

408 — Display search results

410 — Automatically rerun saved search term on trigger event

412 — Display the subsequent search results

1000

1002 — Receive search term from user

1004 — Send search term to remote server

1006 — Receive search results based on sent search term

1008 — Display search results

1010 — Automatically receiving another search result for the same search term

1012 — Display the subsequent search results

SEARCHING AND DISPLAYING MULTIMEDIA SEARCH RESULTS

CROSS-REFERENCE TO RELATED APPLICATIONS

The present application is a continuation of U.S. patent application Ser. No. 18/139,576, entitled "Searching And Displaying Multimedia Search Results", filed Apr. 26, 2023, which is a continuation of U.S. patent application Ser. No. 17/327,486, entitled "Searching And Displaying Multimedia Search Results", filed May 21, 2021, which is a continuation of U.S. patent application Ser. No. 14/558,648, entitled "System and Method for Searching Multimedia", filed Dec. 2, 2014, which is a continuation of patent application Ser. No. 14/536,339, entitled "System and Method for Searching Multimedia", filed Nov. 7, 2014, which is a continuation in part of patent application Ser. No. 13/778,068, entitled "Method and Apparatus for Sharing Content", filed Feb. 26, 2013, which is a continuation in part of patent application Ser. No. 13/431,932, entitled "Method and Apparatus for Sharing Content", filed Mar. 27, 2012, all of which are expressly incorporated herein by reference.

FIELD

Various embodiments of the invention relate to systems and methods for providing information about multimedia or television programs such as sports, news, TV shows, music, documentaries, and movies, etc. to user.

BACKGROUND

The number of television programs available to users have dramatically increased over the years. Today there are numerous streaming services that offer thousands of video on demand (VOD) programs. Even traditional cable networks like ABC, CBS, and NBC have started their own streaming services in their efforts to capture the users' attention and loyalty. In addition to all of the available VOD programs, there are also numerous broadcast programs that are available to the users. Consequently, users now face a sea of readily available programs in which they have to wade through in order to find something to watch. One way to help users discover programs to enjoy is to provide a search feature, which is commonly available on all cable, satellite, and streaming systems.

The traditional search feature is helpful in narrowing down the choices of programs from which the user can select. However, often times, the search results are not helpful because the particular program the user is searching for is not yet available on certain channel or service provider to which the user has a subscription. When this occurs, the user usually gives up and forgets about the search. Accordingly, there is a need for a better searching tool that help users discover programs relevant to their initial search on a continuing basis.

SUMMARY OF THE INVENTION

In traditional systems, a search is typically performed only once (at the time of request) unless the user specifically instructs the system to "follow" the search topic or creates an alert for the search. As the collection of available VODs continue to grows, the traditional search process will be less helpful as there is a lack of built-in intelligence to help sort through the flood of available VODs. Accordingly, a system for searching and displaying multimedia search results is disclosed herein.

In an embodiment, a method is disclosed. The method includes supplying a video stream to a primary display. An information request soliciting information associated with content of the video stream on the primary display is received. In response, a plurality of tag data relating to the video stream is supplied to a secondary display, wherein the plurality of tag data are visually and concurrently indicated on a single progress bar of the video stream being displayed on the secondary display, and whereby the tag content data is displayed on the display screen of the secondary display when one of the plurality of tag types is selected.

In an embodiment, a system is provided. The system operates by supplying a video stream to a primary display. An information request soliciting information associated with content of the video stream on the primary display is received. In response, a plurality of tag data relating to the video stream is supplied to a secondary display, wherein the plurality of tag data are visually and concurrently indicated on a single progress bar of the video stream being displayed on the secondary display, and whereby the tag content data is displayed on the display screen of the secondary display when one of the plurality of tag types is selected.

In another embodiment, a non-transitory processor-readable medium having one or more instructions operational on a computing device which, when executed by a processor, cause the processor to perform operations is disclosed. The operations include supplying a video stream to a primary display. An information request soliciting information associated with content of the video stream on the primary display is received. In response, a plurality of tag data relating to the video stream is supplied to a secondary display, wherein the plurality of tag data are visually and concurrently indicated on a single progress bar of the video stream being displayed on the secondary display, and whereby the tag content data is displayed on the display screen of the secondary display when one of the plurality of tag types is selected.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

DETAILED DESCRIPTION

In the following description numerous specific details are set forth in order to provide a thorough understanding of the invention. However, one skilled in the art would recognize that the invention might be practiced without these specific details. In other instances, well known methods, procedures, and/or components have not been described in detail so as not to unnecessarily obscure aspects of the invention.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

Today, more and more people are eliminating their cable and satellite services altogether to go with streaming solutions such as the Roku streaming player. The streaming option is attractive to many people for a variety of reasons including it being a cheaper alternative to cable/satellite television and the instant accessibility to thousands of programs across many different streaming platforms and providers such as Roku® channels, Netflix®, HBO GO, and Hulu®, for example. Additionally, the required investment on hardware is minimal and sometime even free as the streaming software application is preloaded onto many devices.

Figure 1:
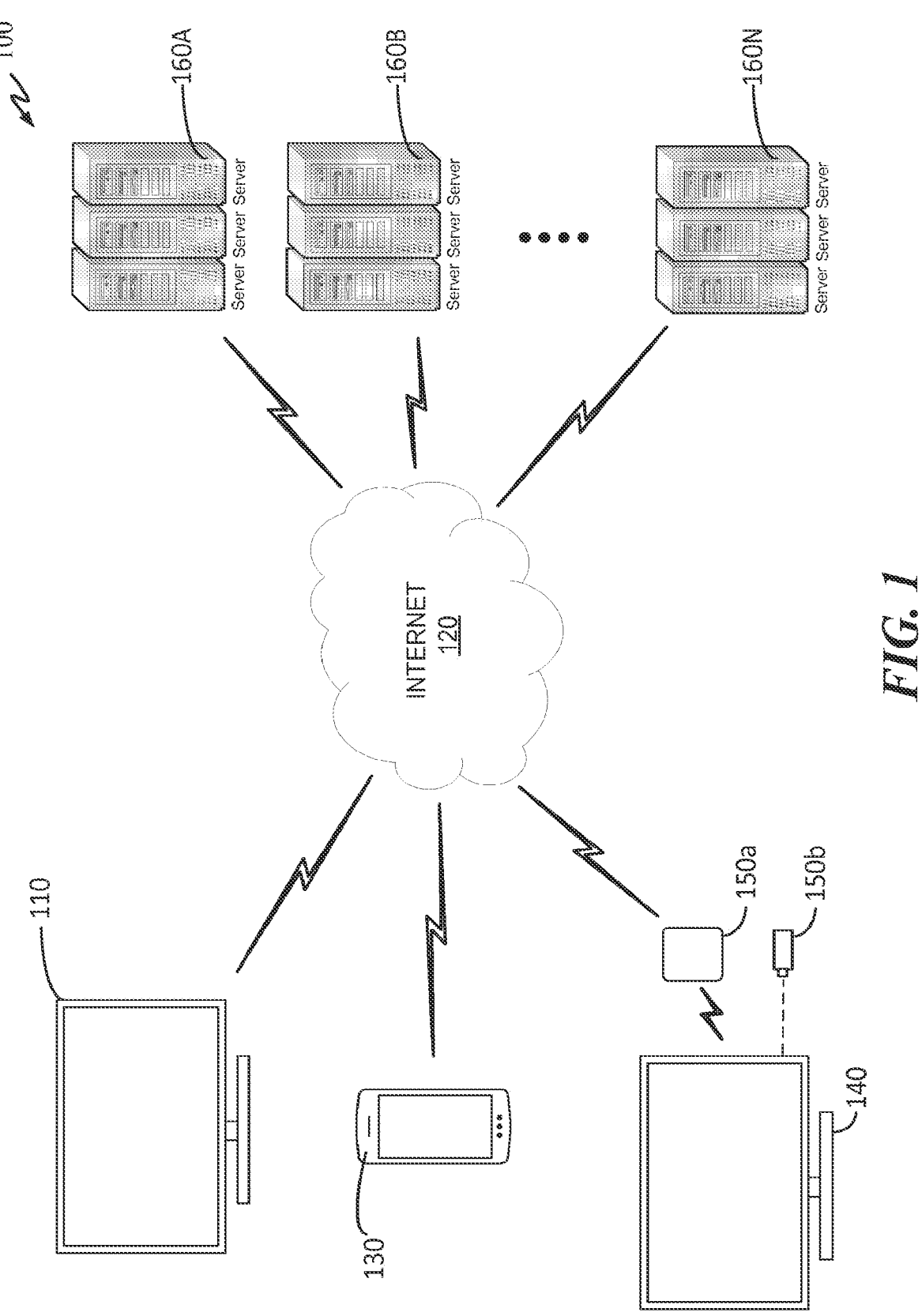
FIG. 1 illustrates an exemplary streaming environment.

FIG. 1 illustrates an exemplary streaming environment 100 common to most streaming systems. As shown in FIG. 1, environment 100 includes a television 110 such as a LED flat screen TV, the Internet 120, a user device 130 such as a mobile phone or tablet, a display device 140, streaming client devices 150*a-b*, and a plurality of servers 160A-160N. Television 110 may be an Internet enabled smart TV having preloaded streaming applications such as the Roku streaming application or Roku TV. For example, TCL® and Hisense® brands televisions include Roku TV right out of the box, thus enabling users to immediately stream programs from a selection of more than 1000+ channels straight to their televisions without the need to purchase any additional hardware or software. Once the streaming application (e.g., Roku TV) is executed, it communicates with one or more content servers 160A-N via Internet 120 to request and receive streaming program for display on television 110.

User device 130 may be a smartphone, a tablet, or any other suitable mobile devices with the ability to access the Internet or broadband wireless such as 4G LTE, 5G, or any other suitable wireless communication standard. User device 130 may include a streaming application such as Roku mobile App (not shown) to enable it to stream programs from one or more servers 160*a-n* via the Internet to user device 130, television 110, or display device 140.

Streaming programs may also be delivered to a display device such as display device 140 using a streaming player 150*a* or streaming stick 150*b*. Each of streaming player 150*a* and streaming stick 150*b* is connected to an audio/video input (e.g., HDMI, MHL) of display device 140. In this set up, all of the software applications needed for streaming and video decoding reside on streaming player 150*a* or streaming stick 150*b*. An exemplary streaming player 150*a* is the Roku 3, and an exemplary streaming stick 150*b* is the Roku Streaming Stick.

Figure 2:
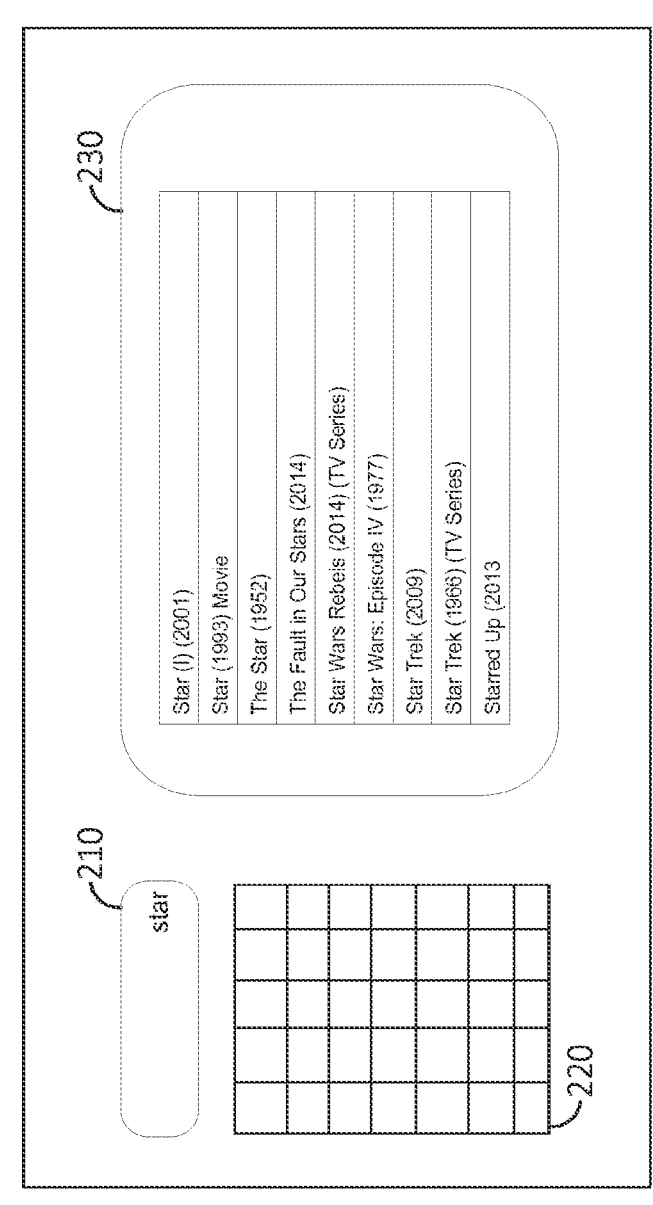
FIG. 2 illustrates an exemplary search interface.

FIG. 2 illustrates a traditional search screen or interface 200 implemented by various smart TVs, electronic program guides (EPGs), and streaming applications. Search interface 200 is typically displayed when the user selects the search function of a media application (not shown). The term media application refers to any software application such as EPG application on set top boxes, smart TV applications, Internet media websites, streaming applications, etc. Search interface 200 includes a keyword entry field 210, a keypad 220, and a search results display area 230. To perform a search, the user simply inputs one or more keywords into entry field 210 using keypad 220. Once the user entered the keyword(s), the media application (where the search function is called) sends the keyword(s) to a remote server such as server 160*a*, where the actual search for programs using the keyword(s) is performed. Once the search is completed by the remote server, the search results is sent to the media application for display in search results display area 230.

In certain system, the keywords of previous searches are saved by the media application and are displayed to the user to allow the user to reselect the previous keywords and re-perform the search by sending the selected keywords to the remote search server. If however, previous keywords are not saved by the media application, then the user would have to reenter the search keyword each time the user wants to perform a search. Even for an advanced system where keywords of previous searches are saved, the user is still required to manually perform the search by re-sending the search keywords to the remote server for searching.

Persistent Searching

Figure 3:
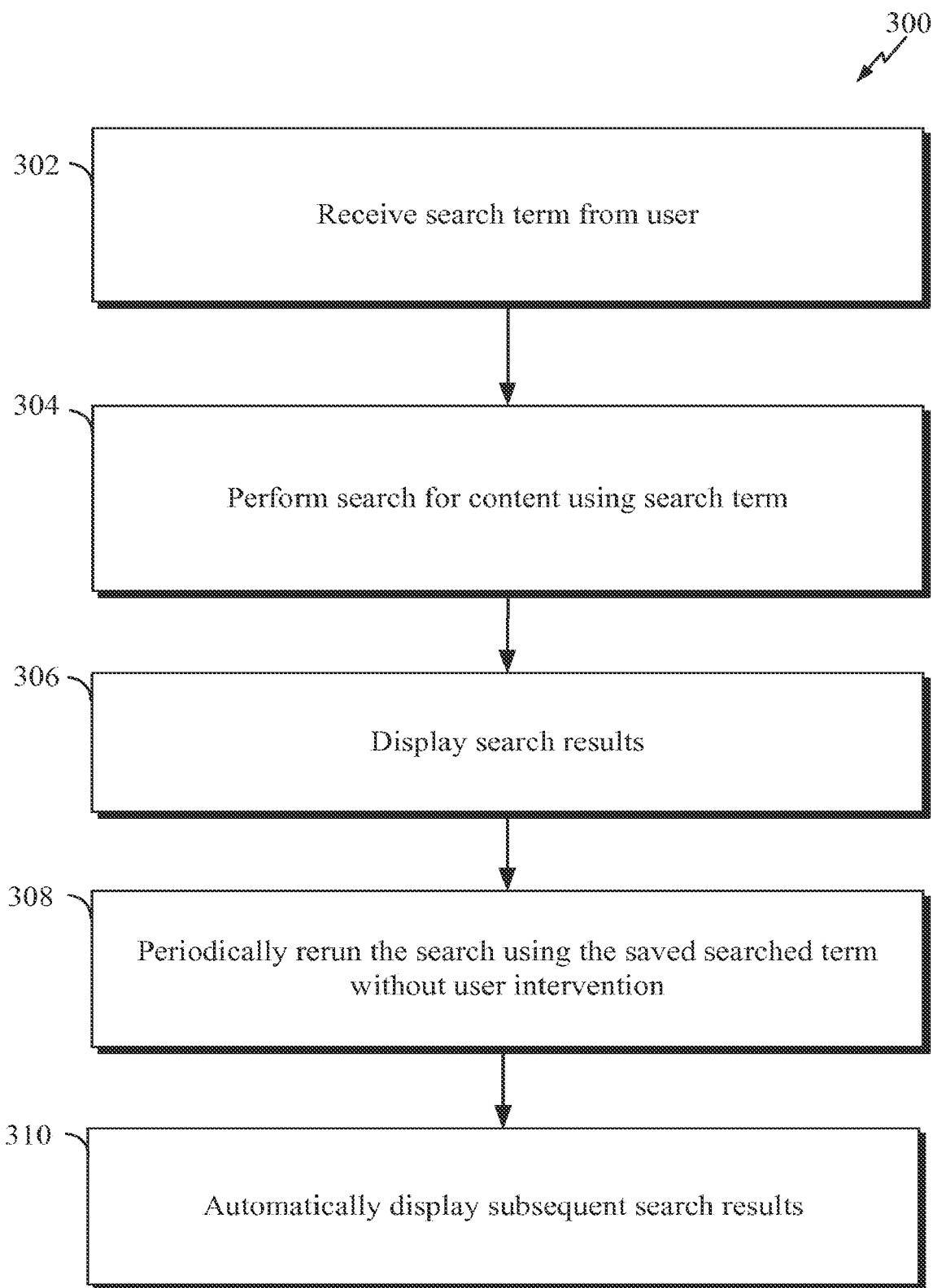
FIG. 3 illustrates an exemplary process for persistent searching in accordance to an aspect of the disclosure.

FIG. 3 illustrates an exemplary system's process 300 for performing persistent searches in accordance to an aspect of the disclosure. Persistent search process 300 enables the user to perform a search just once and the system will periodically re-run the same search to look for new content without any user intervention. In traditional searching systems, the user either have to re-run a previous search or expressly select a follow feature on a program in order to receive new search results. As shown in FIG. 3, persistent search process 300 starts at 302 where the search term is received from the user. The search term may have one or more keywords which is entered by the user using keypad 220 or by voice recognition. Once the search term is entered into the media application, it is then sent to the remote media server to perform the searching. Alternatively, the media application may be configured to use local resources to perform the search locally. In this particular aspect, the local device may search for contents on various remote servers and aggregate the results locally. At 304, a search is perform using the search term entered by the user. At 306, the search results is displayed on a display screen such as television 110, mobile device 130, and display device 140. At 308, the search term is saved and is periodically re-ran without any user intervention. In this way, the user does not have to perform a follow on the search term or inform the system to rerun the search. At 310, the results of a subsequent search is displayed to the user.

Figure 4:
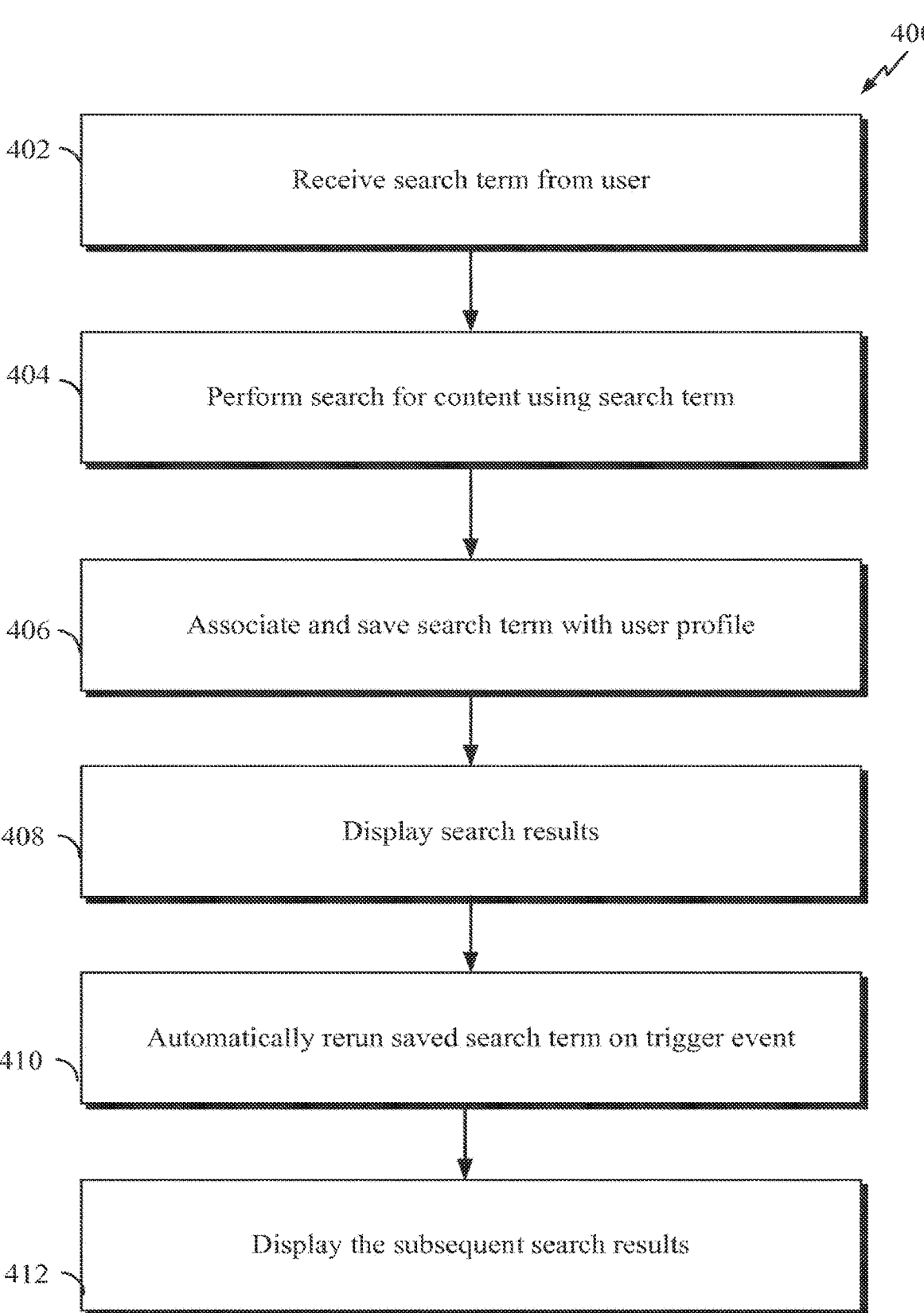
FIG. 4 illustrates an exemplary process for persistent searching based on a trigger event in accordance to an aspect of the disclosure.

FIG. 4 illustrates an exemplary system's process 400 for performing persistent searches in accordance to an aspect of the disclosure. At 402, the search term generated by the user is received. At 404, the search for contents or multimedia programs is performed using the received search term. At 406, the search term is optionally associated with the user's profile in order to build an accurate profile of the user's interest. At 408, the search results is displayed to the user. At 410, the search is automatically re-executed upon an occurrence of a trigger event. In one aspect, search on one or more of the previous search terms is re-executed. The trigger event may be the amount of time since the last search was executed. For example, process 400 may schedule the search to be re-executed every week or month and display the subsequent search results to the user. In one aspect, the results of the original search and results of subsequent searches can be visually displayed (at 412) in a timeline format. In this way, the user is able to quickly distinguish which contents are new in the search results.

In another aspect, the trigger event may be a boot event at the local device. In response to a boot cycle (e.g., power on, restart), block 410 is repeated to automatically rerun the saved search. User's behaviors may also be trigger events. For example, the system may detect that the user has been browsing various channels for a long time without playing any content. This could indicate that the user is lost within the abundant choices of available programming and perhaps guidance is needed. In this situation, process 400 may automatically rerun one or more of the saved search terms upon occurrence of a trigger event and display the subsequent search results (at 412) to the user as a recommendation. It should be noted that the system may rerun multiple searches using independently saved search term(s) for a single trigger event.

Trigger events may also be assigned to certain screens or menu functions. For example, a trigger event may be assigned to the search screen, social network functions (e.g., tweeting, facebook posting, etc.), or to a certain channel. In one aspect, when the system associates a search term to a user profile (at 406), other information such as channel, date, time, may also be associated to the search term. In this way, when the user access the Disney® channel, for example, the system may automatically rerun one or more previously saved searches relating to Disney such as previous searches for frozen, maleficent, Angelina Jolie, etc. In another aspect, whenever the user enters the search screen via the search menu, the system may automatically rerun one or more of the previous searches and display the results before any new search is executed.

Figure 5:
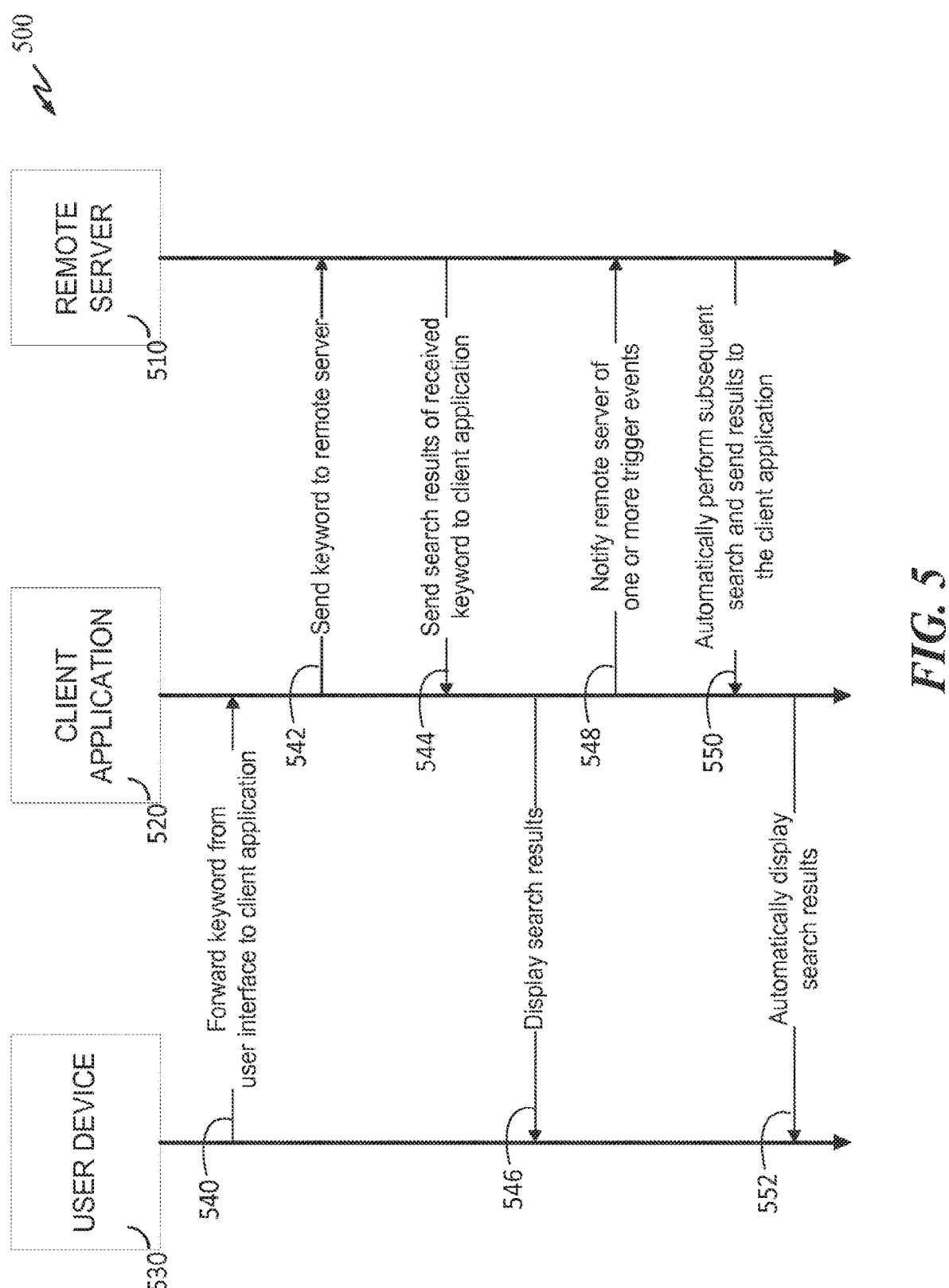
FIG. 5 illustrates an exemplary communication process between devices of a system for searching multimedia content in accordance to an aspect of the disclosure.

FIG. 5 illustrates the communication process between various devices of a searching system 500 in accordance to one aspect of the disclosure. System 500 includes a remote server 510, a client application 520, and a user device 530. Client application 520 may be part of a standalone device such as streaming player 150*a* or streaming stick 150*b*. Alternatively, client application 520 may be installed in user device 530, which may be a smart TV, a smartphone, or tablet. At 540, one or more keywords from user device 530 input interface (such as interface 210) is read by client application. At 542, the client application sends the keyword to remote server 510. At 544, the remote server performs a search using the received keyword and sends the search results back to client application 520. The keyword may also be saved by remote server 510 at 544. At 546, the client application causes user device 546 to display the search results. At 548, client application 520 detects one or more trigger events and requests remote server 510 of the trigger events. At 550, based on the type of trigger events, remote server 510 automatically performs a search using the one or more of the previously saved searches and keywords. For example, if the trigger event is the user selecting a sports channel, remote server 510 may rerun previous searches on the sports movies, football, or Babe Ruth. At 552, the search results for the one or more searches are displayed at user device 530. In one aspect, the trigger event is generated by remote server 510 whenever it detects new content relevant to one of the saved searches.

Figure 6:
FIGS. 6-9 illustrate exemplary user interfaces of systems for searching for multimedia content in accordance to an aspect of the disclosure.
Figure 6:

FIG. 6 illustrates an exemplary search interface 600 in accordance to one aspect of the disclosure. Search interface 600 includes traditional graphical user interface (GUI) objects such as an input field 610, a keypad 620, and a search results display area 630. In addition to the traditional GUI objects, search interface 600 also includes a persistent search results area 640, which is made up of a plurality of panels 650-680 positioned in a timeline based manner. Panels 650-680 are visual representation of search results performed on September 1St, September 8th, September 10th, and the current date, respectively, using one of the previously saved searches. In one aspect, the default previous search used to automatically perform another search is the last search the user conducted. Alternatively, the default previous search could be based on the user profile. For example, the default previous search could be based on the user's interest in foods, golf, movie genre, etc. In one aspect, the user profile could override the last search conducted. In this scenario, the user may conduct a one off search on a person in the news, but because that person has no relation to the user's interest (per the user's profile), the last search is ignored and would not be used to generate the search results for display in the persistent search area 640.

As shown in FIG. 6, the plurality of panels 650 are the top or most relevant search results conducted on September 1st. In one aspect, every time a trigger event occurred, another search is performed and displayed in persistent search display area 640. One of the trigger events can be the activation of a search screen/function such as search screen 600. In this way, each time the user enters or activates search interface 600, a new search is automatically conducted and displayed in area 640. Panels 660 and 670 are from searches conducted on September 8th and 10th, respectively. Similarly, panel 680 show the most relevant search result that was rerun today. In one aspect, search interface 600 includes a plurality of persistent search areas shown as multiple rows of panels (not shown). Each of the persistent search areas has its own unique search terms that were previously used to conduct searches.

Figure 7:
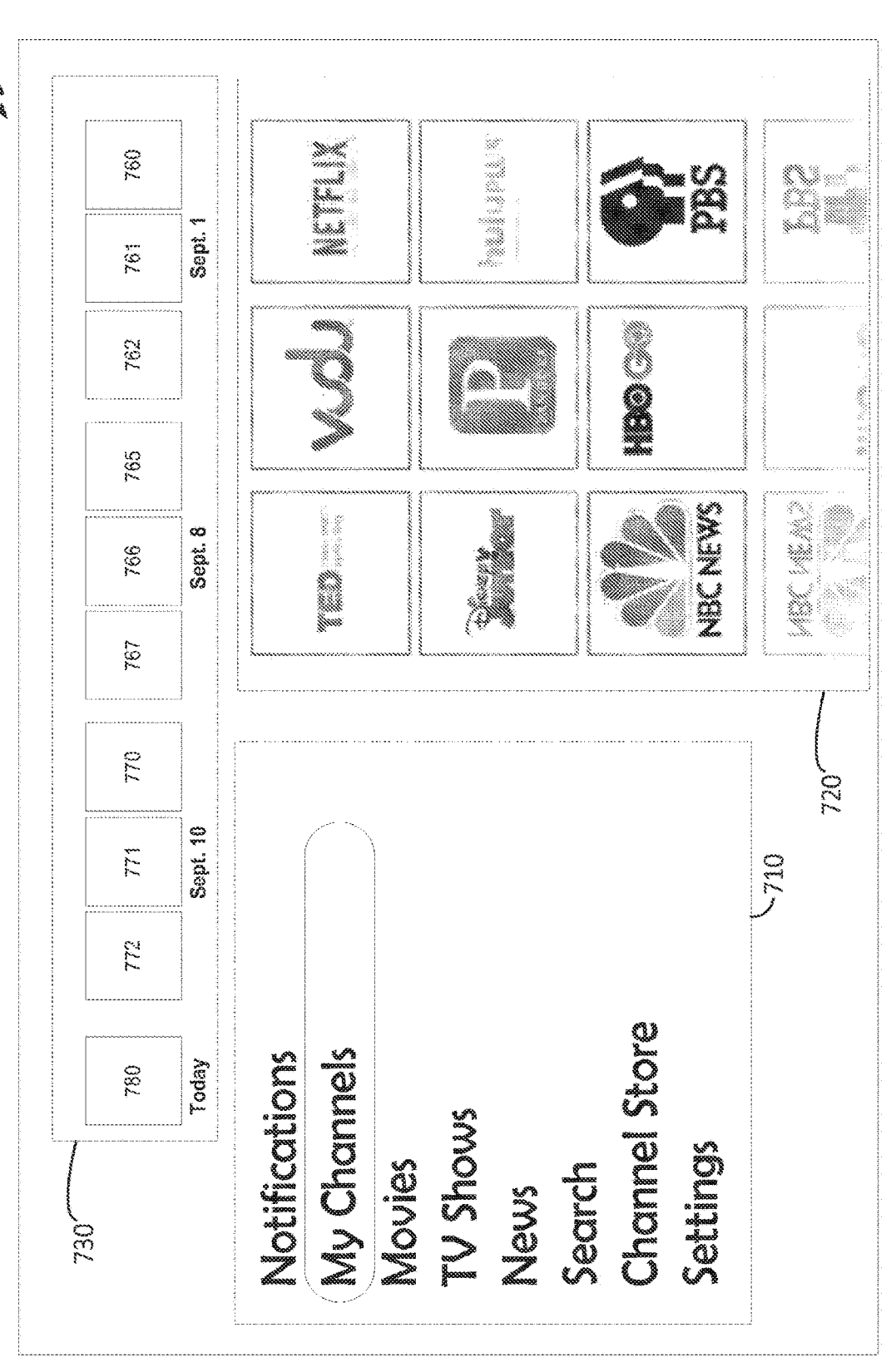

FIG. 7 illustrates an exemplary user interface 700 in accordance to one aspect of the disclosure. User interface 700 includes a menu selection area 710, a main display area 720, and a persistent search display area 730, which includes a plurality of search results 760-780 on various dates. User interface 700 allows the user to navigate the home screen menus and at the same time to view the latest search results (780) of a previous search in display area 730. It is important to note that searches conducted to populate persistent search display area 730 are conducted automatically using one or more of previously saved searches and no user input is involved. Additionally, the automatic search may be conducted based on the occurrence of a trigger event. In one aspect, the trigger event may be based on an external event such as a news event or a trending event. For example, the user may have previously conducted a search on the term Amadeus and find nothing. However, if the a child prodigy playing a Mozart concerto made national news and thereby generated a lot interests on Mozart, the movie Amadeus may suddenly be made available by one of the streaming providers. In such a scenario, the combination of the persistent search display area 730 and trigger event and helps the user discover contents relevant to the user's interests.

Figure 8:
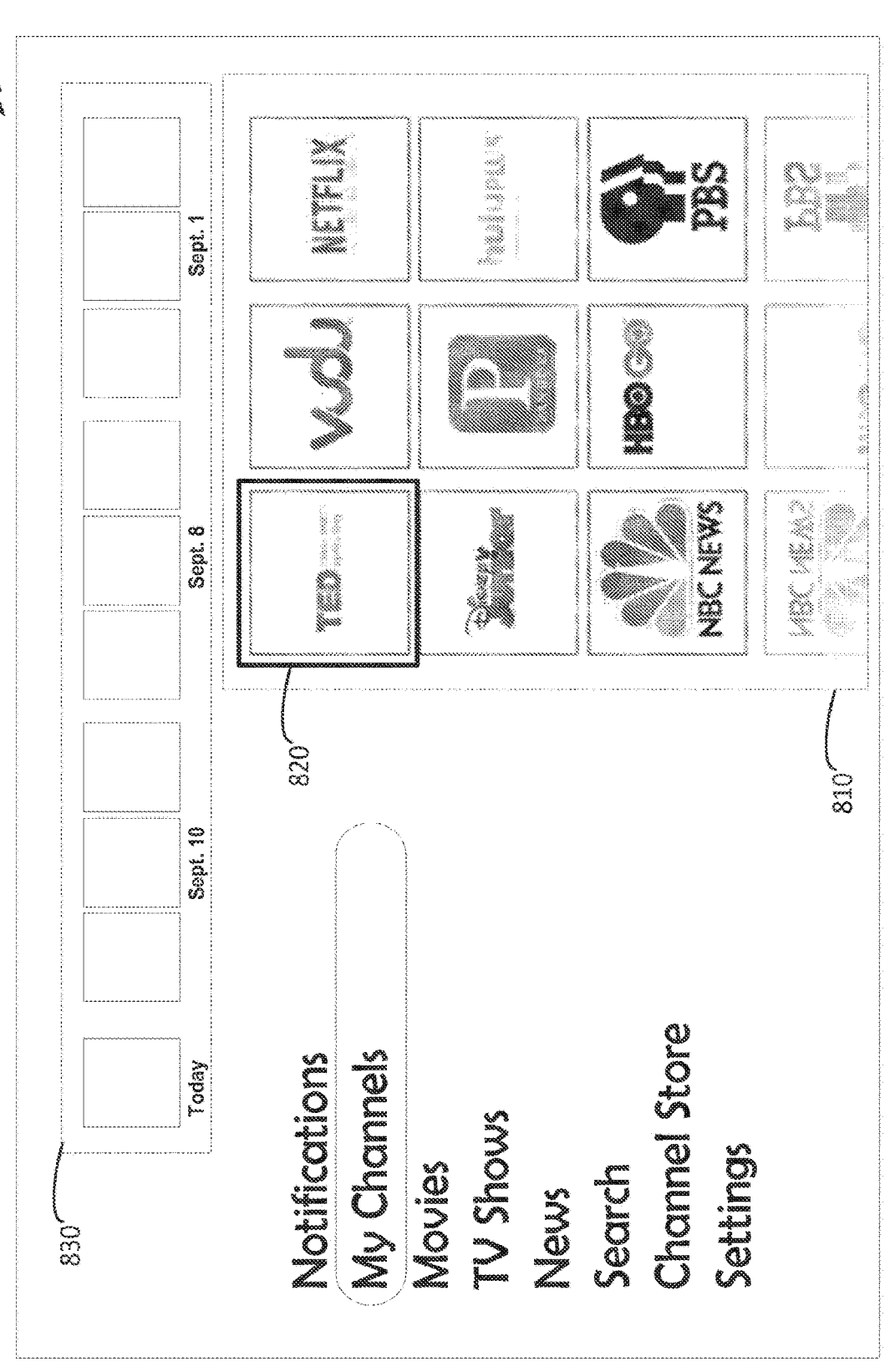

FIG. 8 illustrates an exemplary user interface 800 in accordance to one aspect of the disclosure. User interface 800 is similar to user interface 700 in that it also includes a menu area, a main display area 810 and a persistent search display area 830. As shown in FIG. 8, the channel TED is selected by the user as indicated by highlighted area 820. In one aspect, the trigger event is tied to the specific channel the user has selected. Over a long period of use of the system, the user may have performed numerous searches across a disparate types of genres and topics. In this case, it might be difficult to select one of the previously saved search for researching and displaying in display area 830. By associating the search to a channel the user has selected, the system can substantially reduce the number of previously saved searches to select from by weeding out searches that are irrelevant to the channel selected. For example, any previous searches on sports or fashions may be eliminated because they have a very low probability of being relevant to any talks and shows available on the TED channel. Conversely, previous searches on a science personality, an entrepreneur celebrity, or a Nobel Prize winner will likely be selected by the system for persistent searching as they are relevant to the TED channel.

Figure 9:
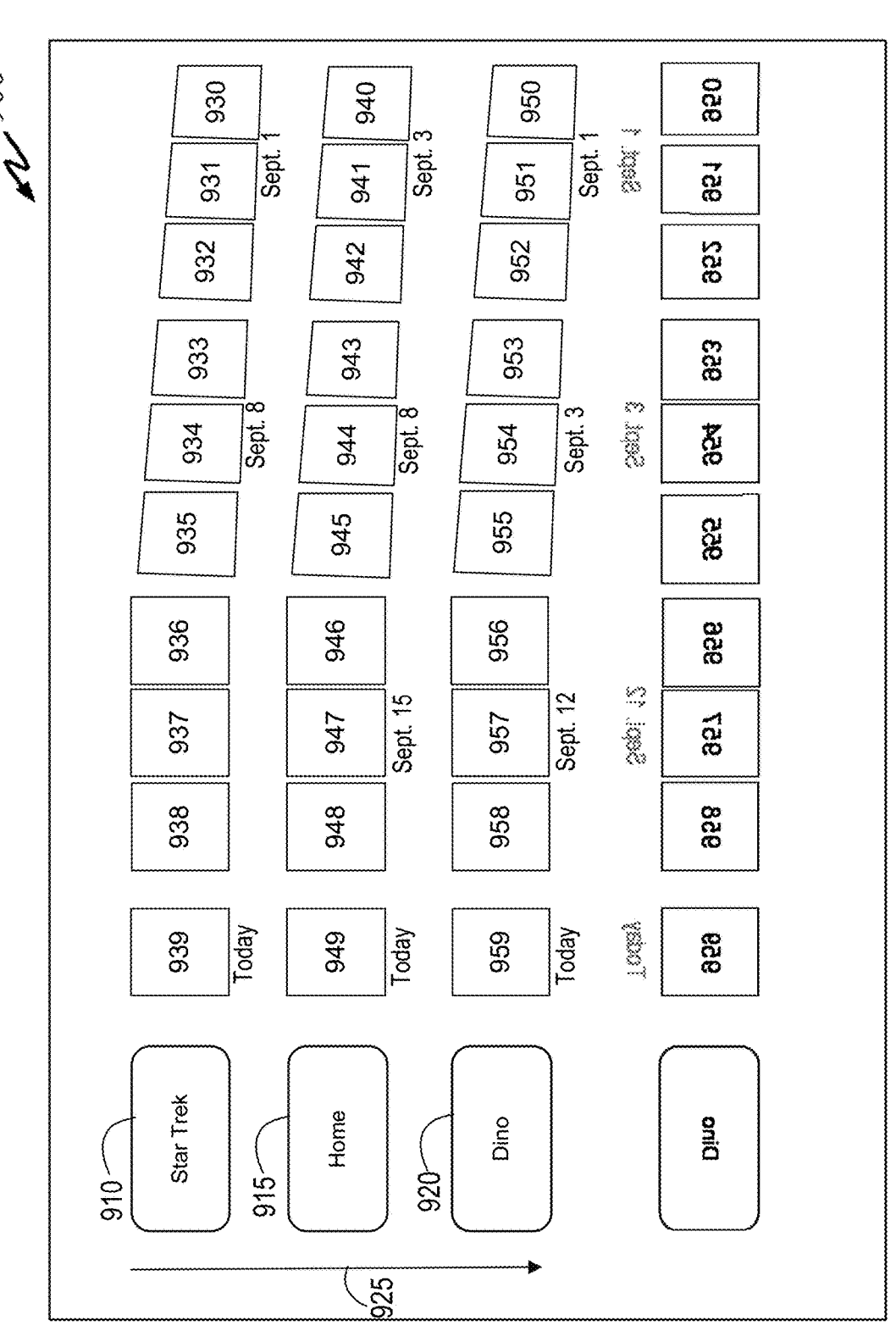

FIG. 9 illustrates an exemplary user interface 900 in accordance to one embodiment of the disclosure. User interface 900 includes a plurality of rows, each row having a plurality of panels displaying search results from a persistent search. Each of interface objects 910, 915, and 920 represents one of the previous search terms. Panels 930-939 contain search results for persistent search of the search term in object 910, "Star Trek". Panels 940-949 contain search results for persistent search of the search term in object 915, "Home". Similarly, panels 950-959 contain search results for persistent search of the search term in object 920, "Dino". User interface also includes scroll bar 925, which allows the user to scroll through various search terms performed in the past. When scrolling through the list of past searches, the system would update the persistent search row by populating panels 939, 949, and 959, for example.

As shown in FIG. 9, each row of panels are displayed in a timeline format. Although only one panel is shown under "Today", the results may yield two or more panels. Additionally, old panels from the oldest dates would scroll off the row as panels from new search from today are added. Additionally, user interface 900 may be implemented on the main display screen or only on the secondary screen while the search menu is displayed on the main display screen.

Figure 10:
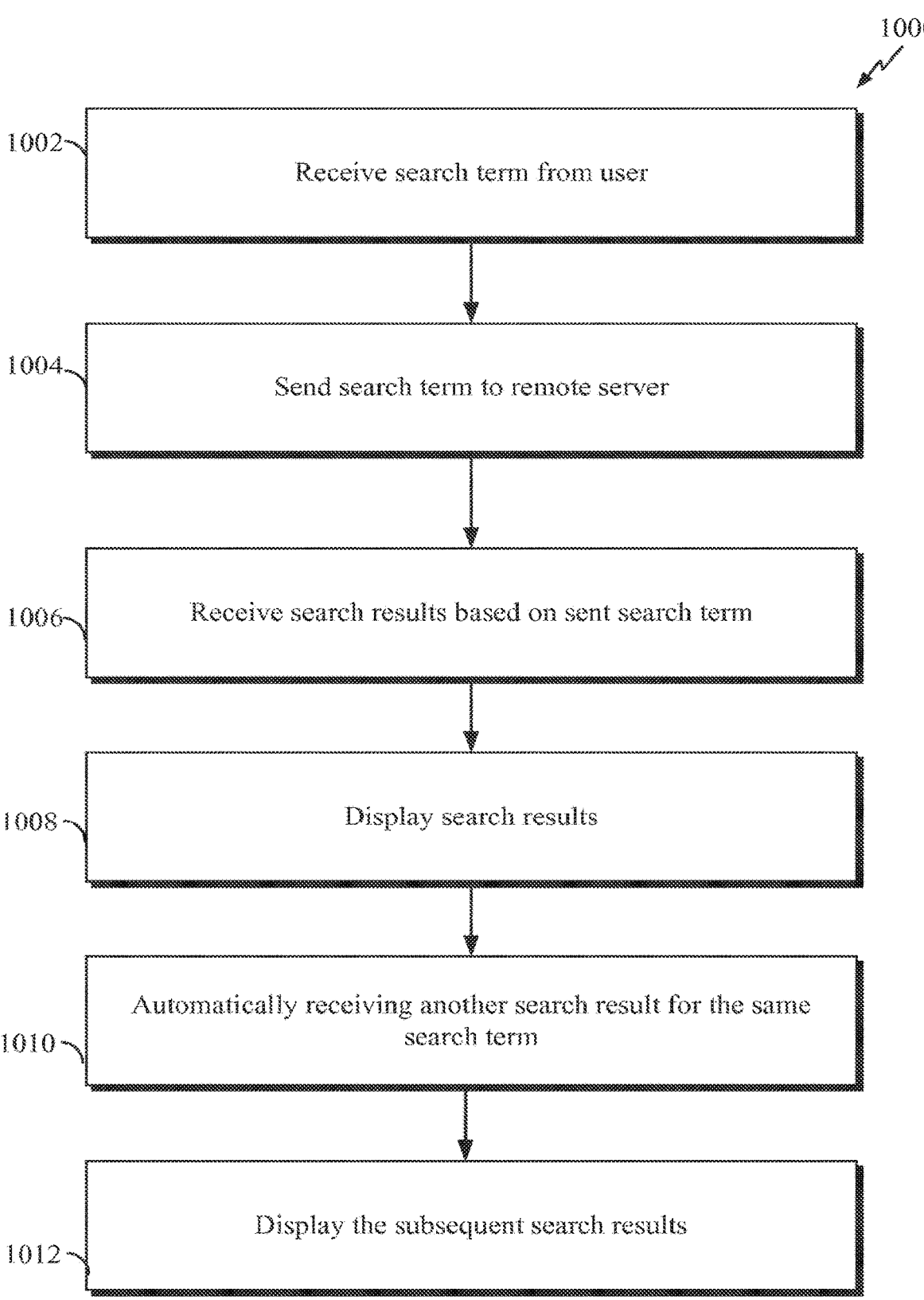
FIG. 10 illustrates an exemplary process for persistent searching in accordance to an aspect of the disclosure.

FIG. 10 illustrates an exemplary process flow 1000 on a user device in accordance to one aspect of the disclosure. Process flow 1000 begins at 1002 where a search term is received from the user. Typically is done via a keypad. Alternatively, voice recognition can be used. At 1004, the search term received at 1002 is sent to the remote server. At 1006, in response to sending the search term to the remote server, the search results is received at the user device. At 1008, the search results are displayed. At 1010, another search results is automatically received at the user device. In one aspect, the subsequent search results is automatically received (sent by remote server) upon the occurrence of a trigger event. At 1012, the search results of the subsequent search is displayed.

Exemplary Hardware Implementation

Figure 11:
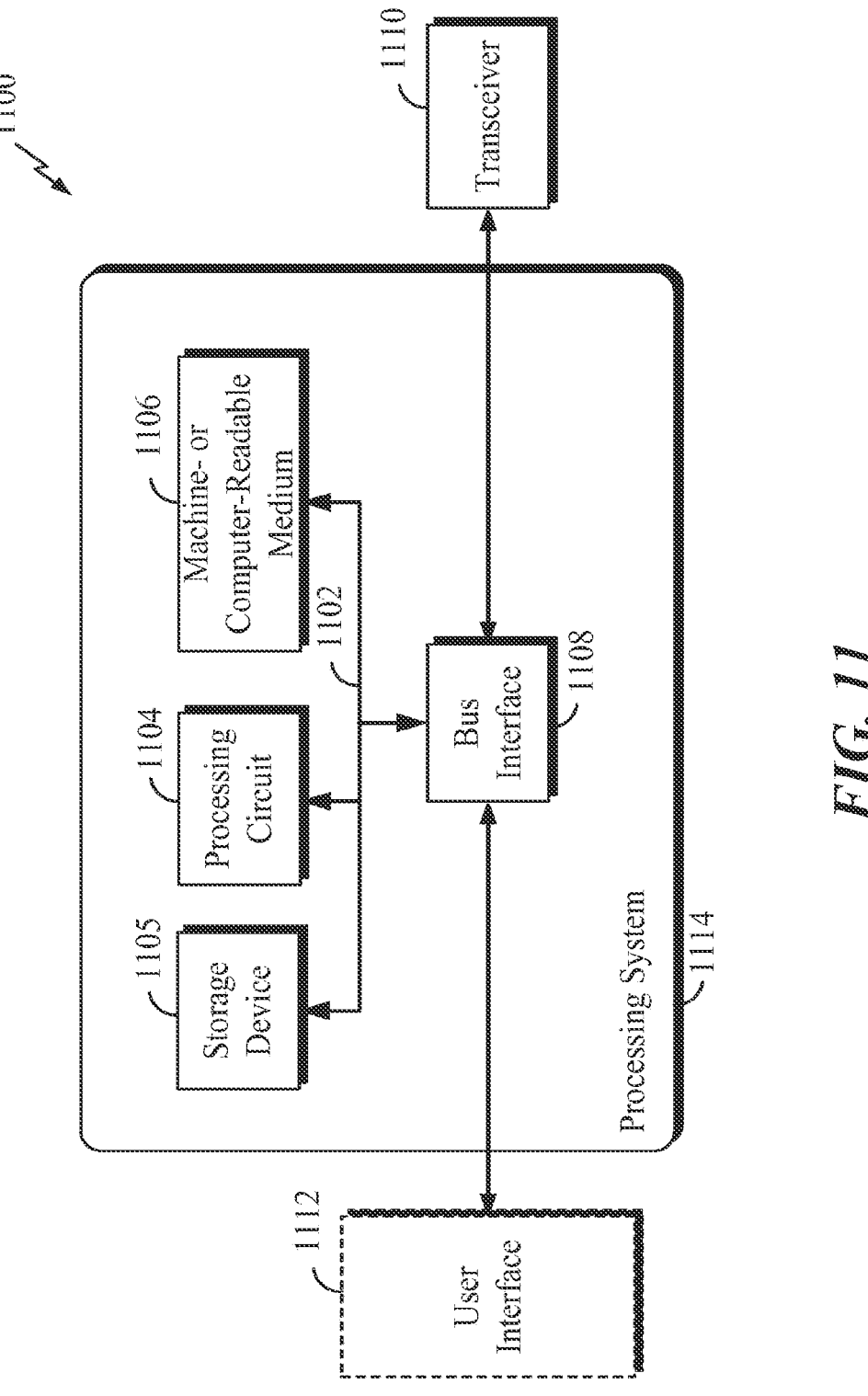
FIG. 11 is a block diagram illustrating an example of a hardware implementation for an apparatus employing a processing system that may exploit the systems and methods of FIGS. 3-10 in accordance to an aspect of the disclosure.

FIG. 11 illustrates an overall system or apparatus 1100 in which the systems, methods and apparatus of FIGS. 1-10 may be implemented. In accordance with various aspects of the disclosure, an element, or any portion of an element, or any combination of elements may be implemented with a processing system 1114 that includes one or more processing circuits 1104. Processing circuits 1104 may include microprocessing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionality described throughout this disclosure. That is, the processing circuit 1104, as utilized in the apparatus 1100, may be used to implement any one or more of the processes described above and illustrated in FIGS. 3, 4, and 10 such as processes for persistently searching for content using previously save searches.

In the example of FIG. 11, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links various circuits including one or more processing circuits (represented generally by the processing circuit 1104), the storage device 1105, and a machine-readable, processor-readable, processing circuit-readable or computer-readable media (represented generally by a non-transitory machine-readable medium 1106.) The bus 1102 may also link various other circuits such as timing sources, peripherals, voltage regulators, and power management circuits, which are well known in the art, and therefore, will not be described any further. The bus interface 1108 provides an interface between bus 1102 and a transceiver 1110. The transceiver 1110 provides a means for communicating with various other apparatus over a transmission medium. Depending upon the nature of the apparatus, a user interface 1112 (e.g., keypad, display, speaker, microphone, joystick) may also be provided.

The processing circuit 1104 is responsible for managing the bus 1102 and for general processing, including the execution of software stored on the machine-readable medium 1106. The software, when executed by processing circuit 1104, causes processing system 1114 to perform the various functions described herein for any particular apparatus. Machine-readable medium 1106 may also be used for storing data that is manipulated by processing circuit 1104 when executing software.

One or more processing circuits 1104 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 1106. The machine-readable medium 1106 may be a non-transitory machine-readable medium. A non-transitory processing circuit-readable, machine-readable or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 1106 may reside in the processing system 1114, external to the processing system 1114, or distributed across multiple entities including the processing system 1114. The machine-readable medium 1106 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system. For example, the machine-readable storage medium 1106 may have one or more instructions which when executed by the processing circuit 1104 causes the processing circuit to: receive, from an application, a request to access the input data; determine a coordinate of the input data; determine a status of the requesting application; and grant the request for access to the input data based on the determined coordinate and the status of the requesting application.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

The various illustrative logical blocks, modules, circuits, elements, and/or components described in connection with the examples disclosed herein may be implemented or performed with a general purpose processing circuit, a digital signal processing circuit (DSP), an application specific integrated circuit (ASIC), a field programmable gate array (FPGA) or other programmable logic component, discrete gate or transistor logic, discrete hardware components, or any combination thereof designed to perform the functions described herein. A general purpose processing circuit may be a microprocessing circuit, but in the alternative, the processing circuit may be any conventional processing circuit, controller, microcontroller, or state machine. A processing circuit may also be implemented as a combination of computing components, e.g., a combination of a DSP and a microprocessing circuit, a number of microprocessing circuits, one or more microprocessing circuits in conjunction with a DSP core, or any other such configuration.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled, in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A computer-implemented method, comprising:

supplying, by at least one computer processor, a video stream to a primary display;

receiving an information request associated with content of the video stream; and in response to receiving the information request, supplying to a secondary display a plurality of tag data relating to the video stream, wherein the plurality of tag data comprises a plurality of different tag sources, different tag types, tag timestamps, and tag content data, wherein the plurality of tag data are visually and concurrently indicated on a single progress bar of the video stream being displayed on the secondary display, and whereby the tag content data is displayed on the secondary display when a tag type of the different tag types is selected.

2. The computer-implemented method of claim 1, wherein the tag content data is displayed as an overlay on a display screen of the secondary display.

3. The computer-implemented method of claim 1, wherein the tag type comprises one of a user tag, a friend tag, and a global tag.

4. The computer-implemented method of claim 3, wherein the user tag is a tag generated by a user of the primary display or the secondary display.

5. The computer-implemented method of claim 4, wherein the global tag is an aggregation of tags generated by other users.

6. The computer-implemented method of claim 3, wherein each of the different tag types is visually distinguished from each other on the single progress bar of the video stream.

7. The computer-implemented method of claim 1, wherein the tag timestamps comprise location information of at least one tag information on the single progress bar of the video stream.

8. A system, comprising:

one or more memories; and at least one processor each coupled to at least one of the memories and configured to perform operations comprising:

supplying a video stream to a primary display;

receiving an information request associated with content of the video stream; and in response to receiving the information request, supplying to a secondary display a plurality of tag data relating to the video stream, wherein the plurality of tag data comprises a plurality of different tag sources, different tag types, tag timestamps, and tag content data, wherein the plurality of tag data are visually and concurrently indicated on a single progress bar of the video stream being displayed on the secondary display, and whereby the tag content data is displayed on the secondary display when a tag type of the different tag types is selected.

9. The system of claim 8, wherein the tag content data is displayed as an overlay on a display screen of the secondary display.

10. The system of claim 8, wherein the tag type comprises one of a user tag, a friend tag, and a global tag.

11. The system of claim 10, wherein the user tag is a tag generated by a user of the primary display or the secondary display.

12. The system of claim 11, wherein the global tag is an aggregation of tags generated by other users.

13. The system of claim 10, wherein each of the tag types is visually distinguished from each other on the single progress bar of the video stream.

14. The system of claim 8, wherein the tag timestamps comprise location information of at least one tag information on the single progress bar of the video stream.

15. A non-transitory processor-readable medium having one or more instructions operational on a computing device which, when executed by a processor, cause the processor to perform operations comprising:

supplying a video stream to a primary display;

receiving an information request associated with content of the video stream; and in response to receiving the information request, supplying to a secondary display a plurality of tag data relating to the video stream, wherein the plurality of tag data comprises a plurality of different tag sources, different tag types, tag timestamps, and tag content data, wherein the plurality of tag data are visually and concurrently indicated on a single progress bar of the video stream being displayed on the secondary display, and whereby the tag content data is displayed on the secondary display when a tag type of the different tag types is selected.

16. The non-transitory processor-readable medium of claim 15, wherein the tag content data is displayed as an overlay on a display screen of the secondary display.

17. The non-transitory processor-readable medium of claim 15, wherein the tag type comprises one of a user tag, a friend tag, and a global tag.

18. The non-transitory processor-readable medium of claim 17, wherein the user tag is a tag generated by a user of the primary display or the secondary display.

19. The non-transitory processor-readable medium of claim 18, wherein the global tag is an aggregation of tags generated by other users.

20. The non-transitory processor-readable medium of claim 17, wherein each of the tag types is visually distinguished from each other on the single progress bar of the video stream.

* * * * *